United States Patent [19]
Bryant et al.

[11] Patent Number: 5,627,975
[45] Date of Patent: May 6, 1997

[54] INTERBUS BUFFER FOR USE BETWEEN A PSEUDO LITTLE ENDIAN BUS AND A TRUE LITTLE ENDIAN BUS

[75] Inventors: Christopher Bryant, Austin; Brian Reynolds, Round Rock, both of Tex.

[73] Assignee: Motorola, Inc., Schaumburg, Ill.

[21] Appl. No.: 284,945

[22] Filed: Aug. 2, 1994

[51] Int. Cl.$^6$ .................................................. G06F 13/00
[52] U.S. Cl. ............................................. 395/307; 395/380
[58] Field of Search ..................................... 395/250, 200, 395/325, 307; 364/238

[56] References Cited

U.S. PATENT DOCUMENTS

| | | | |
|---|---|---|---|
| 5,132,898 | 7/1992 | Sakamura et al. | 395/310 |
| 5,191,581 | 3/1993 | Woodbury et al. | 370/85.9 |
| 5,313,231 | 5/1994 | Yin et al. | 345/199 |
| 5,388,227 | 2/1995 | McFarland | 395/307 |
| 5,423,010 | 6/1995 | Mizukami | 395/375 |
| 5,446,482 | 8/1995 | Van Aken et al. | 345/199 |
| 5,446,651 | 8/1995 | Moyse et al. | 364/760 |
| 5,446,847 | 8/1995 | Keeley et al. | 395/280 |

OTHER PUBLICATIONS

James, "Multiplexed Buses: The Endian Wars Continue", 1990.

*Primary Examiner*—William M. Treat
*Assistant Examiner*—Kenneth R. Coulter
*Attorney, Agent, or Firm*—Lee E. Chastain

[57] ABSTRACT

An interbus buffer (18) coordinates data transfers between two different sized buses. The first bus (processor bus) allows data to be ordered according to either a big endian protocol or a "munged" little endian mode. The second bus (local bus) allows data to be ordered according to either a big endian protocol or a true little endian mode but does not define a transaction size. The disclosed interbus buffer coordinates interbus data transfers in spite of the variety of different transaction sizes and operating modes.

2 Claims, 5 Drawing Sheets

1 x 8-BYTE TRANSFER 2 x 4-BYTE TRANSFERS 2 x 3-BYTE TRANSFERS

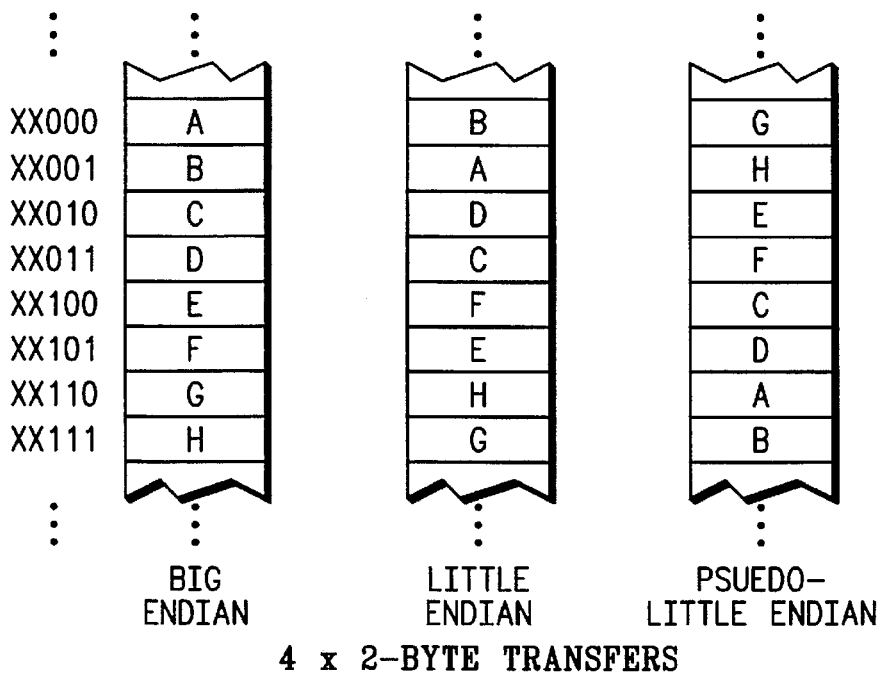
FIG. 5  4 x 2-BYTE TRANSFERS
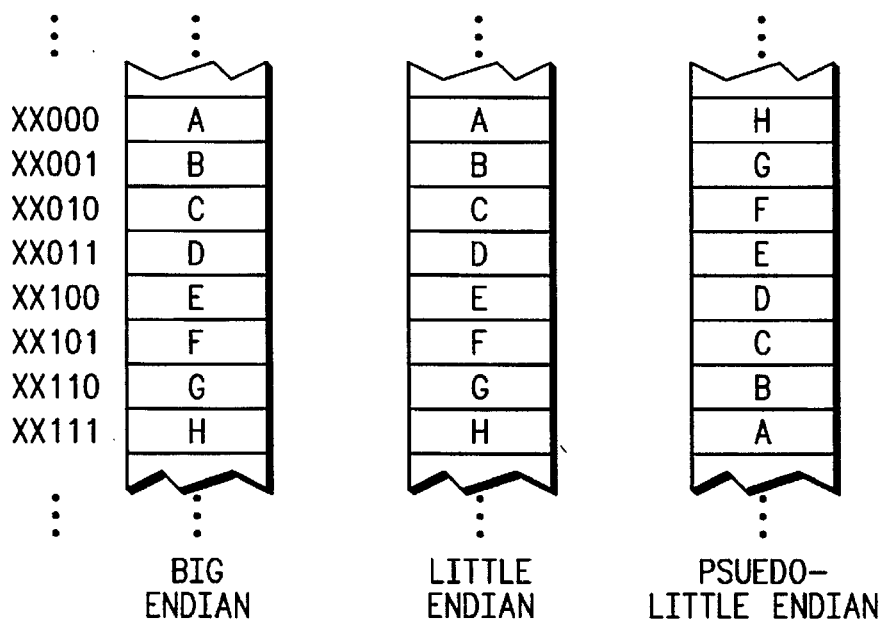
FIG. 6  8 x 1-BYTE TRANSFERS
| TRANSFER SIZE | BE-TO-PLE |
|---|---|
| 1 | ADDRESS XOR (111) |
| 2 | ADDRESS XOR (110) |
| 3 | ADDRESS XOR (101) |
| 4 | ADDRESS XOR (100) |
| 8 | ADDRESS XOR (000) |
FIG. 7

1

INTERBUS BUFFER FOR USE BETWEEN A PSEUDO LITTLE ENDIAN BUS AND A TRUE LITTLE ENDIAN BUS

FIELD OF THE INVENTION

The present invention generally relates to digital computing systems, and more specifically to bus-to-bus buffer circuits.

BACKGROUND OF THE INVENTION

Every digital computing device may be segregated into one of two mutually exclusive classes depending upon how it orders individual data units in multi-unit transfer. The members of these two classes are known as either "big endian" or "little endian" devices. In current digital computing devices, eight data bits, a "byte," is typically the smallest individually addressable data unit. Most digital computing devices, however, transfer one to eight bytes at a time identified by the address of a single byte in the transfer and some size signal. Therefore, it becomes relevant how the device orders each of the bytes relative to the single address of the data transfer.

Big endian devices assign the lowest address to the most significant byte of the multi-unit transfer (left-most byte), the next sequential address to the next most significant byte of the transfer, etc. This strategy is referred to as big endian because the big end of the multi-unit transfer (considered as a binary number) comes first in storage. IBM's RISC System/6000, IBM's System 370 and Motorola's 68000 family of microprocessors are examples of big endian devices.

Little endian devices assign the lowest address to the least significant byte of the multi-unit transfer (right-most byte), the next sequential address to the next least significant byte of the transfer, etc. This strategy is referred to as little endian because the little end of the multi-unit transfer (considered as a binary number) comes first in storage. DEC's VAX architecture and Intel's X86 family of microprocessors are examples of little endian devices.

Oftentimes it is desirable to combine a big endian device and a little endian device in the same digital computing system. Multi-unit data transfers between the big endian device and the little endian device must be reordered. Otherwise, the data output by one device would not be intelligible to the other device. There are at least two strategies used to reorder data in multi-unit transfers: "programmed byte-swapping" and "address munging."

Programmed byte-swapping is a solution which incorporates a certain number of multiplexers interposed in the data path connecting the two different devices. These multiplexers perform the byte reordering depending upon the data transfer size and data path size. For instance, if both devices transfer data in up to four byte quanta (both have 32-bit data buses), then each byte must have a 4:1 multiplexer connected to it to route any one of the four incoming bytes to any one of the four byte lanes.

Address munging is a solution that reorders data transferred from big endian devices to little endian devices. This solution combines two steps. First, the address of each data transfer destined for the little endian device is modified or "munged" to form a second address according to a particular mathematical function. The data transfer is indexed by this second address. Second, the bytes of the data transfer are reversed with respect to the data path.

2

BRIEF DESCRIPTION OF THE DRAWINGS

The features and advantages of the present invention will be more clearly understood from the following detailed description taken in conjunction with the accompanying FIGURES where like numerals refer to like and corresponding parts and in which:

FIGS. 2 through 6 depict, in tabular form, examples of data transfers of various sizes among devices operating in big endian, true little endian and pseudo little endian modes;

FIG. 7 depicts, in tabular form, a mapping scheme for use with data transfers between devices operating in big endian and pseudo little endian modes;

DETAILED DESCRIPTION OF THE PREFERRED EMBODIMENT

Figure 1:
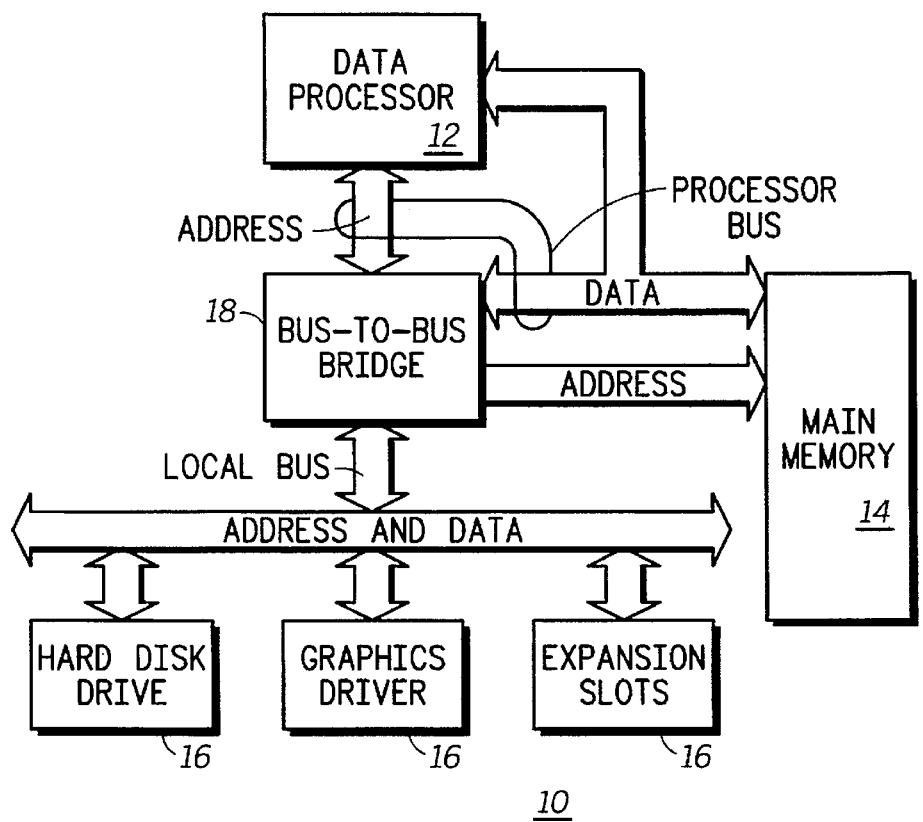
FIG. 1 depicts a block diagram of a data processing system constructed in accordance with the present invention.
Figure 2:
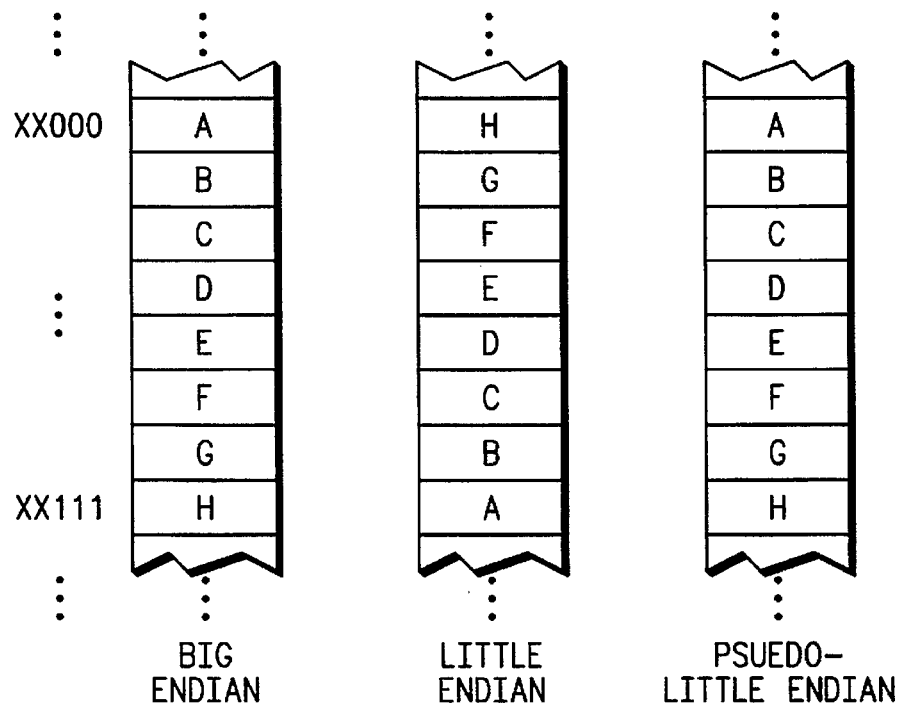

FIG. 1 depicts a block diagram of a data processing system 10 constructed in accordance with the present invention. Data processing system 10 contains a data processor 12 which generates multi-byte data transfers according to either a big endian (hereafter "BE") or a munged big endian (hereafter pseudo little endian or "PLE") ordering scheme. Data processor 12 communicates with a main memory system 14 and to various peripheral devices 16 via a bus-to-bus bridge circuit (or an "interbus buffer") 18. According to the disclosed invention, interbus buffer 18 provides byte reordering functions necessary to interface a big endian bus and a little endian (hereafter "LE") bus.

Continuing with FIG. 1, data processor 12 conforms to a first input/output protocol while peripherals 16 conform to a second input/output protocol. As depicted in FIG. 1, the protocol to which data processor 12 conforms is labeled and is referred to as the "processor bus." The protocol to which peripherals 16 conform is labeled and is referred to as the "local bus." Data processing 10 may contain devices operating in accordance with two or more different buses for a number of reasons not related to the present invention: the local bus may be an industry-standard for certain types of devices such as hard disk storage systems, graphics drivers, expansion slots, etc., the two buses may have been developed at different times, data processing system 10 may incorporate technology from two different markets, etc.

In the depicted embodiment, the processor bus is a sixty-four bit implementation of the PowerPC (TM International Business Machines Corporation) 60X bus protocol. Each 60X bus transaction specifies either one or four sequential sixty-four bit transactions by de-asserting or asserting a T-BURST control signal, respectively. In the case of a single sixty-four bit transaction, a three-bit control signal, T-SIZE, validates from one to eight bytes of the transaction.

In the depicted embodiment, the local bus is a thirty-two bit implementation of the Peripheral Component Interconnect ("PCI") protocol. The de-assertion of a control signal, FRAME, indicates the final thirty-two bit transfer in a single transaction. Four byte-enable control signals individually validate each byte of the four byte transfer. As will become apparent below, the difference in bus sizes and the lack of a priori transaction size information in a PCI transaction precludes the use of the known byte reordering solutions, i.e. programmable byte swapping.

FIGS. 2 through 6 depict, in tabular form, examples of data transfers of various sizes among devices operating in BE, true little endian (hereafter "LE") and PLE modes. Initially, these FIG.s will be used to illustrate the operations of BE, LE, and PLE devices. Later, these same FIG.s will be used to illustrate the operation of interbus buffer 18.

FIG. 7 depicts, in tabular form, a mapping scheme for use with data transfers between devices operating in BE and PLE modes. The described table is intended to illustrate the operation of devices able to transfer up to eight bytes at a time. As depicted, the three least significant bits of the starting address of a BE transfer are exclusively-OR'd ("XOR'd") with a certain bit pattern depending upon the transaction size. This action generates a "munged" address or a PLE starting address. A device, such as data processor 12, performs this function internally before outputting the PLE transaction address. The PLE address may then be used to either read or write data from a LE or PLE device. If the transaction is a read or write operation from a LE device, then the eight bytes are individually reversed with respect to the data path when they are transferred. If the transaction is a read or write operation from another PLE device, then no byte reversal is necessary.

Returning to FIG. 2, a BE device generates a single eight-byte transfer indexed by the starting address XX000, an "aligned" double-word transfer, where "X" is a don't care address bit. The transfer may be a read or a write. In this example and in all following examples, the most significant byte is represented by "A," the next most significant byte is represented by "B," etc. As depicted in FIG. 7, the three least significant bits of the address are XOR'd with "000." The corresponding PLE or "munged" address is also XX000. Therefore, the eight bytes A through H are output from a BE device operating in PLE mode ("BE/PLE") to the same starting address, XX000, in the same order, A through H.

If these eight bytes are transferred to a LE device directly or via a PLE device, then the eight bytes A through H are reversed with respect to the data path. In particular, the byte occupying the first PLE-byte-lane (in this case A) is re-mapped to the eighth LE-byte-lane (address XX111), the byte occupying the second PLE-byte-lane (in this case B) is re-mapped to the seventh LE-byte-lane (address XX110), the byte occupying the third PLE-byte-lane (in this case C) is re-mapped to the sixth LE-byte-lane (address XX101), the byte occupying the fourth PLE-byte-lane (in this case D) is re-mapped to the fifth LE-byte-lane (address XX100), the byte occupying the fifth PLE-byte-lane (in this case E) is re-mapped to the fourth LE-byte-lane (address XX011), the byte occupying the sixth PLE-byte-lane (in this case F) is re-mapped to the third LE-byte-lane (address XX010), the byte occupying the seventh PLE-byte-lane (in this case G) is re-mapped to the second LE-byte-lane (address XX001), and the byte occupying the eighth PLE-byte-lane (in this case H) is re-mapped to the first LE-byte-lane (address XX000).

Returning to FIG. 3, a BE device generates two four-byte transfers indexed by the starting addresses XX000 and XX100, two "aligned" word transfers. These transfers may be reads or writes. For instance, the first transfer may write the four bytes A through D associated with the starting address XX000 to main memory 14. As depicted in FIG. 7, the three least significant bits of the address are XOR'd with "100." The corresponding PLE or "munged" address is XX100. Therefore, the four bytes A through D are written to address locations XX100 through XX111. If these four bytes are transferred from main memory 14 to a LE device or are transferred directly from the BE/PLE device to a LE device, then the entire data path is reversed. (Only the four valid bytes are enabled.)

Continuing with the write example, the second four-byte transfer will write the four bytes E through H associated with the starting address XX100 to main memory 14. As depicted in FIG. 7, the three least significant bits of the address are XOR'd with "100." The corresponding PLE or "munged" address is XX000. Therefore, the four bytes E through H are written to address locations XX000 through XX011. If these four bytes are transferred from main memory 14 to a LE device or are transferred directly from the BE/PLE device to the LE device, then the entire data path is reversed. (Only the four valid bytes are enabled.)

Returning to FIG. 4, a BE device generates two three-byte transfers indexed by the starting addresses XX000 and XX101. These transfers may be reads or writes. For instance, the first transfer may write the three bytes A through C associated with the starting address XX000 to main memory 14. As depicted in FIG. 7, the three least significant bits of the address are XOR'd with "101." The corresponding PLE or "munged" address is XX101. Therefore, the three bytes A through C are written to address locations XX101 through XX111. If these three bytes are transferred from main memory 14 to a LE device or are transferred directly from the BE/PLE device to the LE device, then the entire data path is reversed. (Only the three valid bytes are enabled.)

Continuing with the write example, the second transfer will also write the three bytes E through G associated with the starting address XX101 to main memory 14. As depicted in FIG. 7, the three least significant bits of the address are XOR'd with "101." The corresponding PLE or "munged" address is XX000. Therefore, the three bytes E through G are written to address locations XX000 through XX010. If these three bytes are transferred from main memory 14 to a LE device or are transferred directly from the BE/PLE device to the LE device, then the entire data path is reversed. (Only the three valid bytes are enabled.)

Returning to FIG. 5, a BE device generates four two-byte transfers indexed by the starting addresses XX000, XX010, XX100, and XX110, four "aligned" half-word transfers. These transfers may be reads or writes. For instance, the first transfer may write the two bytes A and B associated with the starting address XX000 to main memory 14. As depicted in FIG. 7, the three least significant bits of the address are XOR'd with "110."The corresponding PLE or "munged" address is XX110. Therefore, the two bytes A and B are written to address locations XX110 and XX111. If these two bytes are transferred from main memory 14 to a LE device or are transferred directly from the BE/PLE device to the LE device, then the entire data path is reversed. (Only the two valid bytes are enabled.)

Continuing with the write example, the second two-byte transfer will write bytes C and D associated with the starting address XX010 to main memory 14. As depicted in FIG. 7, the three least significant bits of the address are XOR'd with "110." The corresponding PLE or "munged" address is XX100. Therefore, the two bytes C and D are written to address locations XX100 and XX101. If these two bytes are transferred from main memory 14 to a LE device or are transferred directly from the BE/PLE device to the LE device, then the entire data path is reversed. (Only the two valid bytes are enabled.)

Continuing with the write example, the third two-byte transfer will write bytes E and F associated with the starting address XX100 to main memory 14. As depicted in FIG. 7, the three least significant bits of the address are XOR'd with "110." The corresponding PLE or "munged" address is XX010. Therefore, the two bytes E and F are written to address locations XX010 and XX011. If these two bytes are transferred from main memory 14 to a LE device or are transferred directly from the BE/PLE device to the LE device, then the entire data path is reversed. (Only the two valid bytes are enabled.)

Continuing with the write example, the fourth two-byte transfer will write bytes G and H associated with the starting address XX110 to main memory 14. As depicted in FIG. 7, the three least significant bits of the address are XOR'd with "110." The corresponding PLE or "munged" address is XX000. Therefore, the two bytes G and H are written to address locations XX000 and XX001. If these two bytes are transferred from main memory 14 to a LE device or are transferred directly from the BE/PLE device to the LE device, then the entire data path is reversed.(Only the two valid bytes are enabled.)

Returning to FIG. 6, a BE device generates eight single-byte transfers indexed by the eight starting addresses XX000 through XX111. These transfers may be reads or writes. For instance, the eight single-byte transfers may individually write the eight bytes A through H to main memory 14. As depicted in FIG. 7, the three least significant bits of each address is XOR'd with "111." The eight starting addresses XX000 through XX111 are munged to generate the eight PLE addresses XX111 through XX000, respectively. Therefore, the eight bytes H through A are written to address locations XX000 and XX111, respectively. If these bytes are transferred from main memory 14 to a LE device or are transferred directly from the BE/PLE device to the LE device, then the entire data path is reversed. (Only the valid bytes are enabled.) It should be noted that the BE byte order and LE byte order are identical in this case. In general, there is no difference between the BE, LE, and PLE modes when the data transfer size is the same size as the smallest data unit.

Figure 8:
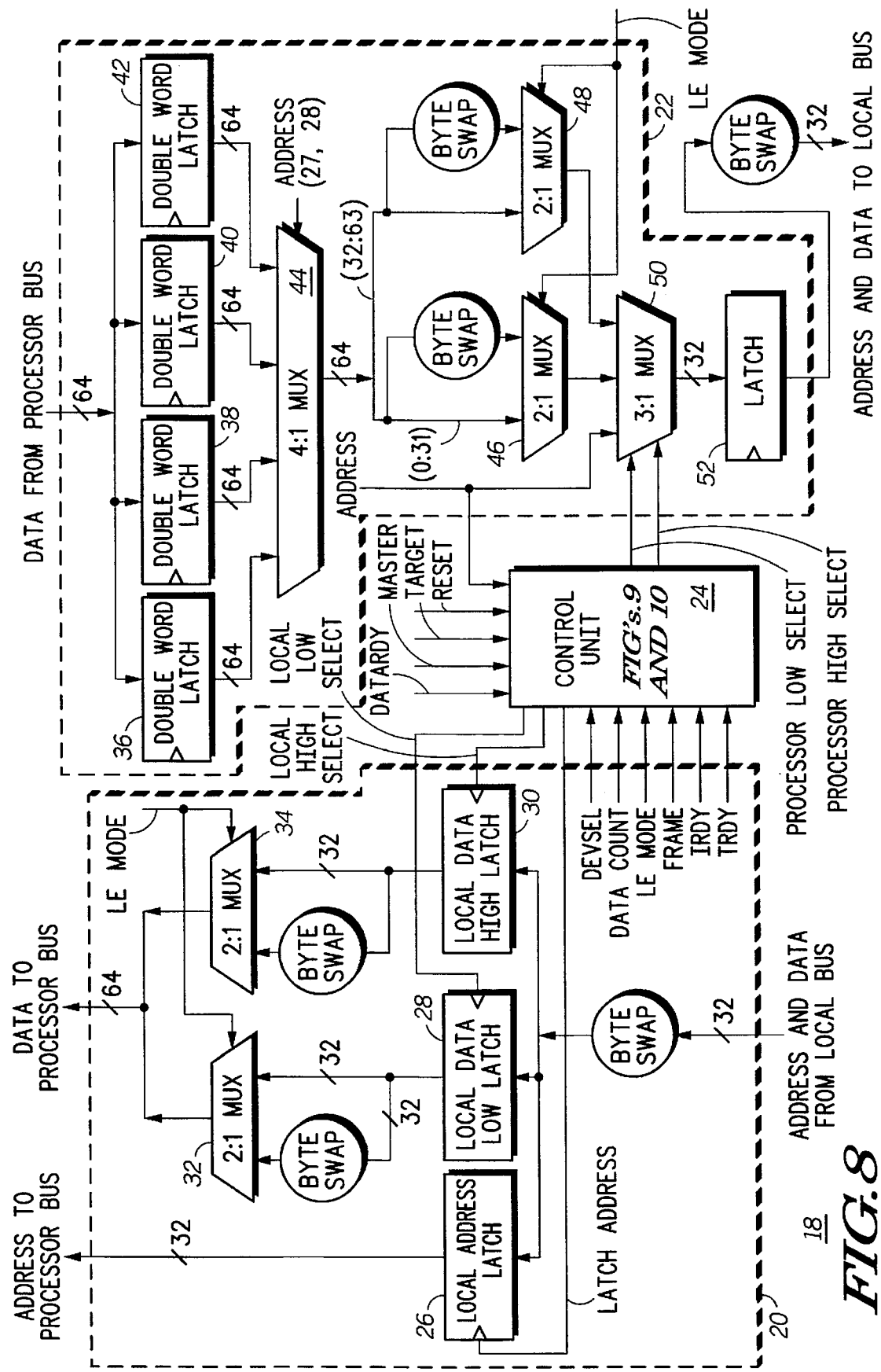
FIG. 8 depicts a block diagram of a bus-to-bus ("interbus buffer") depicted in FIG. 1.

FIG. 8 depicts a block diagram of interbus buffer 18 depicted in FIG. 1. Interbus buffer 18 has a left-hand portion 20, a right-hand portion 22, and a common control unit 24.

Left-hand portion 20 and control unit 24 control the flow of data and addresses from the local bus to the processor bus. Data flows from the local bus to the processor bus when data processor 12 reads data from a device coupled to the local bus or when a device coupled to the local bus writes data to main memory 14. Addresses flow from the local bus to the processor bus when the device coupled to the local bus reads or writes data to main memory 14. Data processor 12 reads data from a device coupled to the local bus in response to its execution of a load instruction. A device coupled to the local bus reads and writes data to main memory 14 in response to the device's various operations.

Right-hand portion 22 and control unit 24 control the flow of data and addresses from the processor bus to the local bus. Data flows from the processor bus to the local bus when data processor 12 writes data to a device coupled to the local bus or when a device coupled to the local bus reads data from main memory 14. Addresses flow from the processor bus to the local bus when data processor 12 reads or writes data to a device coupled to the local bus. Data processor 12 writes data to a device coupled to the local bus in response to its execution of a store instruction and in response to a data coherency protocol, "data cast-out after snooping." A device coupled to the local bus reads data from main memory 14 in response to the device's various operations.

Continuing with left-hand portion 20 depicted in FIG. 8, data and address information from the local bus enters at the bottom and flows upwards to the processor bus. Specifically, thirty-two data bits enter left-hand portion 20 and are byte swapped with respect to each other: the first byte is rerouted to the fourth byte lane, the second byte is rerouted to the third byte lane, the third byte is rerouted to the second byte lane, and the fourth byte is rerouted to the first byte lane. The depicted embodiment is fabricated using a multi-layer metal interconnect, metal oxide semiconductor ("MOS") process. The described byte reversal may be accomplished by the advantageous placement of the metal to metal vias.

After being byte swapped, the thirty-two data bits are input to a local address latch 26, to a local data low latch 28, and to a local data high latch 30. A control signal LATCH_ADDRESS causes local address latch 26 to sample and hold the input data bits. The input address bits are then routed to the processor address bus to select eight data bytes. A control signal LOCAL_LOW_SELECT causes local data low latch 28 to sample and hold the input data bits. A control signal LOCAL_HIGH_SELECT causes local data high latch 30 to sample and hold the input data bits. Control unit 24 generates the control signals LATCH_ADDRESS, LOCAL_LOW_SELECT and LOCAL_HIGH_SELECT. The operation of control unit 24 is described below in connection with FIGS. 9 and 10.

The four bytes output by local data low latch 28 are byte swapped again and connected to one set of inputs of a thirty-two bit 2:1 multiplexer ("MUX") 32. Multiplexer 32 also receives the thirty-two bits output by local data low latch 28 which are not byte swapped. The four bytes output by local data high latch 30 are byte swapped again and connected to one set of inputs of a thirty-two bit 2:1 multiplexer ("MUX") 34. Multiplexer 34 also receives the thirty-two bits output by local data high latch 30 which are not byte swapped. A control signal LE_MODE selects the outputs of multiplexers 32 and 34. In particular, the control signal LE_MODE is asserted when the local device sourcing the data is a LE device (and the processor bus devices are PLE devices). The control signal LE_MODE is de-asserted when the local device sourcing the data is a BE device (and the processor bus devices are BE devices). When asserted, the control signal LE_MODE causes multiplexers 32 and 34 to output the non-swapped outbuts of local data low latch 28 and local data high latch 30. (The bytes are swapped only once when input, resulting in byte reordering). When de-asserted, the control signal LE_MODE causes multiplexers 32 and 34 to output the byte swapped outputs of local data low latch 28 and local data high latch 30. (The bytes are swapped twice, resulting in no byte reordering). The thirty-two bits output by multiplexer 32 are concatenated with the thirty-two bits output by multiplexer 34 to a form a sixty-four bit data signal. This data signal is connected to the processor data bus depicted in FIG. 1.

Continuing with right-hand portion 22 depicted in FIG. 8, data from the processor bus enters at the top and flows downwards to the local bus. Specifically, sixty-four data bits enter right-hand portion 22 and are latched by one of four double word latches 36, 38, 40, and 42 depending upon the fourth and fifth least significant bits of the transaction address, ADDRESS(27, 28). (Data processor 12 often performs bus transactions in aligned double quad-word data units (256 bits). This strategy balances the constraints of bus bandwidth and address translation granularity.) A sixty-four bit 4:1 multiplexer ("MUX") 44 receives each the outputs of double word latches 36, 38, 40, and 42. The fourth and the fifth least significant bits of the address associated with the transaction, ADDRESS(27, 28), select one particular input of multiplexer 44. The sixty-four bit output of multiplexer 44 is split into a more significant half (bits 0:31) and a less significant half (bits 32:63). Each half is the same size as the local bus, thirty-two bits.

The more significant half of bytes output by multiplexer 44 are byte swapped and connected to one set of inputs of a thirty-two bit 2:1 multiplexer ("MUX") 46. Multiplexer 46 also receives the more significant half of bytes output by multiplexer 44 which are not byte swapped. The less significant half of bytes output by multiplexer 44 are byte swapped and connected to one set of inputs of a thirty-two bit 2:1 multiplexer ("MUX") 48. Multiplexer 48 also receives the less significant half of bytes output by multiplexer 44 which are not byte swapped. The control signal LE_MODE selects the outputs of multiplexers 46 and 48. When asserted, the control signal LE_MODE causes multiplexers 46 and 48 to output the non-swapped more significant and less significant halves output by multiplexer 44. When de-asserted, the control signal LE_MODE causes multiplexers 46 and 48 to output the byte swapped more significant and less significant halves output by multiplexer 44. The outputs of multiplexers 46 and 48 are connected to two sets of inputs of a thirty-two bit 3:1 multiplexer ("MUX") 50. Multiplexer 50 also receives the address signals present on the processor address bus. This connection provides a path for a pair of control signals PROCESSOR_LOW_SELECT and PROCESSOR_HIGH_SELECT which select one of the three inputs to multiplexer 50. Control unit 24 generates the control signals PROCESSOR_LOW_SELECT and PROCESSOR_HIGH_SELECT. The operation of control unit 24 is described below in connection with FIGS. 9 and 10. The output of multiplexer 50 is latched by a latch 52. An output of latch 52 is byte swapped before it is connected to the local bus.

Figure 9:
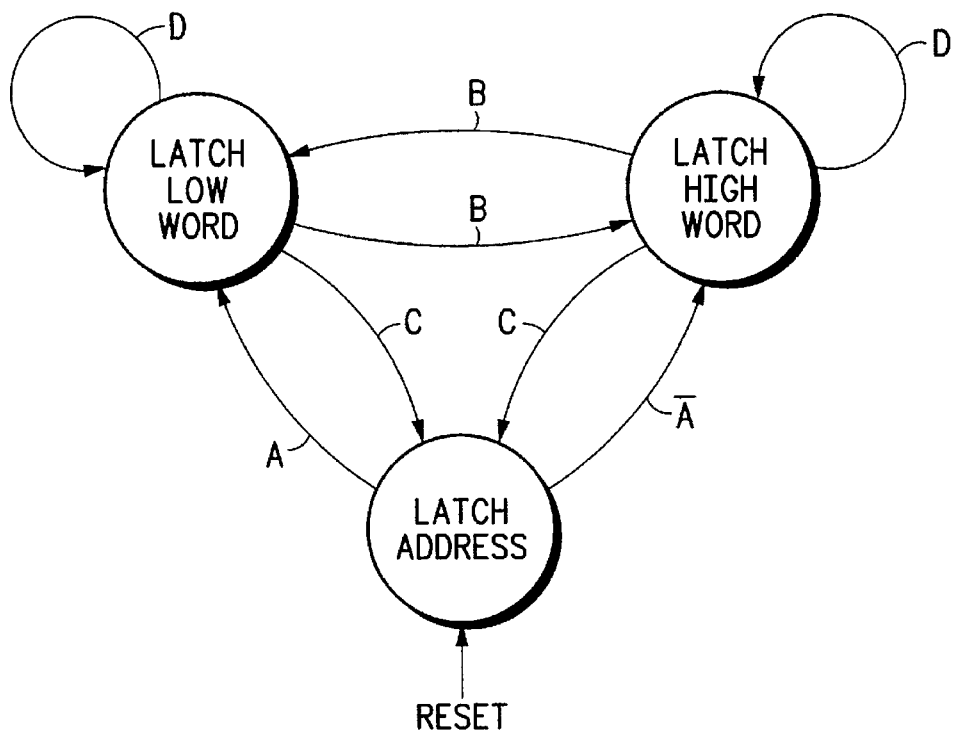
FIGS. 9 and 10 depict two state-transition diagrams illustrating the operation of a portion of the interbus buffer depicted in FIG. 8.
Figure 10:
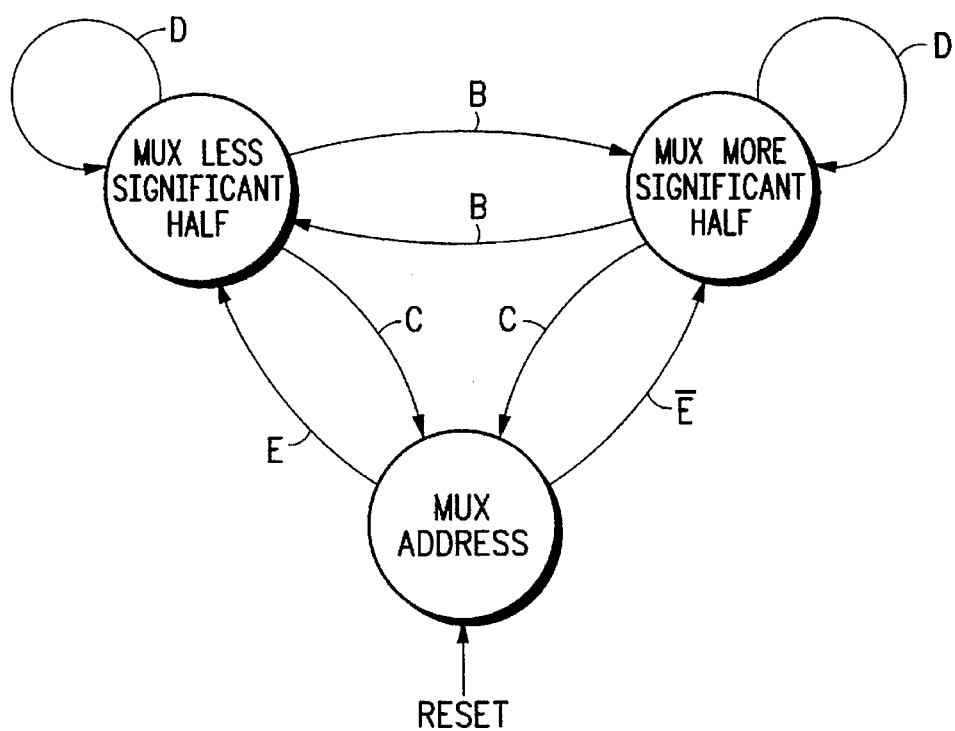

FIGS. 9 and 10 depict two state-transition diagrams illustrating the operation of a portion of the interbus buffer depicted in FIG. 8. Control unit 24 receives eleven input controls signals which determine its operation: DEVSEL, DATA_COUNT, LE_MODE, FRAME, IRDY, TRDY, ADDRESS(29), DATARDY, MASTER, TARGET, and RESET.

The control signal DEVSEL indicates that a target device has accepted a particular transaction. (The PCI bus protocol specifies that DEVSEL is an active low signal. For ease of description, DEVSEL will be described as if it were an active high control signal.)

The control signal DATA_COUNT indicates the number of transfers in a particular transaction as a master. If DATA_COUNT equals zero, then the transaction comprises eight data transfers. Interbus buffer 18 generates DATA_COUNT. In a processor bus initiated transaction, DATA_COUNT represents the number of aligned thirty-two bit quanta to be transferred. DATA_COUNT is calculated from the PowerPC 60X control signals T_SIZE and T_BURST. In a local bus initiated transaction, DATA_COUNT is a "don't care." (The PCI bus protocol does not define such a parameter.)

The control signal LE_MODE indicates whether data processing system 10 is operating in a LE mode (asserted) or a BE mode (deasserted). As described above, data processor 12 operates in the PLE mode when data processing system 10 operates in the LE mode. In the depicted embodiment, an output of a user accessible register in interbus buffer 18 generates the control signal LE_MODE.

The control signal FRAME is a PCI bus protocol control signal. It indirectly indicates the number of data transfers in a particular transaction initiated by a PCI bus compliant device. Such a device asserts FRAME so long as it requires one or more data transfers. (The PCI bus protocol specifies that FRAME is an active low signal. For ease of description, FRAME will be described as if it were an active high control signal.)

The control signal IRDY (pronounced "I-ready") is a PCI bus protocol control signal. When asserted, it indicates that the PCI device that initiated a particular transaction is ready to receive or send data as appropriate given the transaction type. (The PCI bus protocol specifies that IRDY is an active low signal. For ease of description, IRDY will be described as if it were an active high control signal.)

The control signal TRDY (pronounced "T-ready") is a PCI bus protocol control signal. When asserted, it indicates that the PCI device that is the target device of a particular transaction is ready to receive or send data as appropriate given the transaction type. (The PCI bus protocol specifies that TRDY is an active low signal. For ease of description, TRDY will be described as if it were an active high control signal.)

The control signal ADDRESS(29) is the thirtieth bit of thirty-two address bits of a particular bus-to-bus transfer. Control unit 24 latches the control signal ADDRESS(29) each clock cycle for use in the following clock cycle as described below. This latched control signal is denoted as LATCH[ADDRESS(29)].

The control signal DATARDY (pronounced "data ready") is generated by interbus buffer 18. When asserted, it indicates that data from either data processor 12 or main memory 14 is available for transfer to the local bus.

The control signals MASTER and TARGET indicate whether data processor 12 or a device connected to the local bus is the master of a particular transaction. When asserted, MASTER indicates that data processor 12 is the master of interbus buffer 18. When asserted, TARGET indicates that a device connected to the local bus is the master of interbus buffer 18.

A pin on interbus 18 generates the control signal RESET. When asserted, RESET reinitializes interbus buffer 18.

Returning to FIG. 9, a state-transition diagram is depicted illustrating the operation of the control signals LATCH_ADDRESS, LOCAL_LOW_SELECT, and LOCAL_HIGH_SELECT. The control signals LOCAL_LOW_SELECT and LOCAL_HIGH_SELECT point to and latch the less significant and more significant data word flowing from the local bus to the processor bus. Control unit 24 manipulates three states towards that end: LATCH ADDRESS, LATCH LOW WORD and LATCH HIGH WORD. Control unit 24 asserts the control signal LATCH_ADDRESS if and only if it is in the state LATCH ADDRESS. Control unit 24 asserts the control signal LOCAL_LOW_SELECT if and only if it is in the state LATCH LOW WORD. Control unit 24 asserts the control signal LOCAL_HIGH_SELECT if and only if it is in the state LATCH HIGH WORD.

Control unit 24 is initialized to the LATCH ADDRESS state after the control signal RESET is asserted. Control unit 24 transitions to the LATCH LOW WORD state if a function A is logically true. The function A is reproduced below. Conversely, control unit 24 transitions from the LATCH ADDRESS to the LATCH HIGH WORD state if the function A is logically false. Control unit 24 transitions from the LATCH LOW WORD state to the LATCH HIGH WORD state or vice versa if a function B is logically true. The function B is reproduced below. Control unit 24 transitions from the LATCH LOW WORD state to the LATCH ADDRESS state or from the LATCH HIGH WORD state to the LATCH ADDRESS state if a function C is logically true. The function C is reproduced below. Control unit 24 remains in the LATCH LOW WORD state or in the LATCH HIGH WORD state if a function D is logically true.

Returning to FIG. 10, a state-transition diagram is depicted illustrating the operation of the control signals PROCESSOR_LOW_SELECT and PROCESSOR_HIGH_SELECT. The control signals PROCESSOR_LOW_SELECT and PROCESSOR_HIGH_SELECT point to and output the less significant and more significant data word flowing from the processor bus to the local bus. Control unit 24 manipulates three states towards that end: MUX ADDRESS, MUX LESS SIGNIFICANT HALF and MUX MORE SIGNIFICANT HALF. Control unit 24 asserts the control signal PROCESSOR_LOW_SELECT if and only if it is in the state MUX LESS SIGNIFICANT HALF. Control unit 24 asserts the control signal PROCESSOR_HIGH_SELECT if and only if it is in the state MUX MORE SIGNIFICANT HALF. Multiplexer 50 selects its ADDRESS input if control unit 24 asserts neither control signal PROCESSOR_LOW_SELECT nor control signal PROCESSOR_HIGH_SELECT.

Control unit 24 is initialized to the MUX ADDRESS state after the control signal RESET is asserted. Control unit 24 transitions to the MUX LESS SIGNIFICANT HALF state if a function E is logically true. The function E is reproduced below. Conversely, control unit 24 transitions from the MUX ADDRESS to the MUX MORE SIGNIFICANT HALF state if the function E is logically false. Control unit 24 transitions from the MUX LESS SIGNIFICANT HALF state to the MUX MORE SIGNIFICANT HALF state or vice versa if the function B is logically true. Control unit 24 transitions from the MUX LESS SIGNIFICANT HALF state to the MUX ADDRESS state or from the MUX MORE SIGNIFICANT HALF state to the MUX ADDRESS state if the function C is logically true. Control unit 24 remains in the MUX MORE SIGNIFICANT HALF state or in the MUX LESS SIGNIFICANT HALF if the function D is logically true.

The functions A through E are defined thusly:

$A = \{$LATCH[$\overline{\text{ADDRESS(29)}}$]|DATA_COUNT≠
1&LE_MODE&MASTER$\}$OR
$\{$LATCH[ADDRESS(29)]&
[DATA_COUNT = 1OR$\overline{\text{LE_MODE}}$]MASTER$\}$OR
$\{$[ADDRESS(29)$X$NOR LE_MODE]&TARGET$\}$, $B = \overline{DEVSEL\&IRDY\&TRDY}$,
$C = \overline{FRAME\&DEVSEL}$,
$D = DEVSEL\&[\overline{IRDYORTRDY}]$, and $E = \{\overline{\text{ADDRESS(29)}}$&DATA_COUNT≠
1&LE_MODE&MASTER$\}$OR
$\{$ADDRESS(29)& [DATA_COUNT =
1OR$\overline{\text{LE_MODE}}$]&MASTER$\}$OR
$\{$[ADDRESS(29)$X$ OR$\overline{\text{LE_MODE}}$]&
TARGET&DATARDY$\}$.

The operation of interbus buffer 18 may be illustrated with reference to various ones of FIGS. 2 through 6 and FIGS. 9 and 10.

Figure 3:
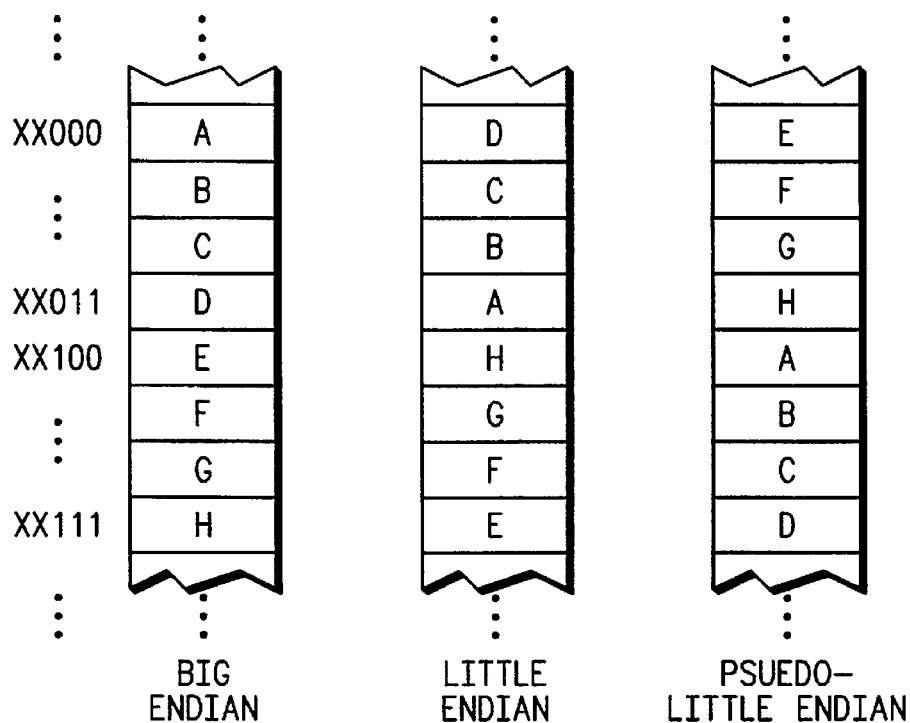
Figure 4:
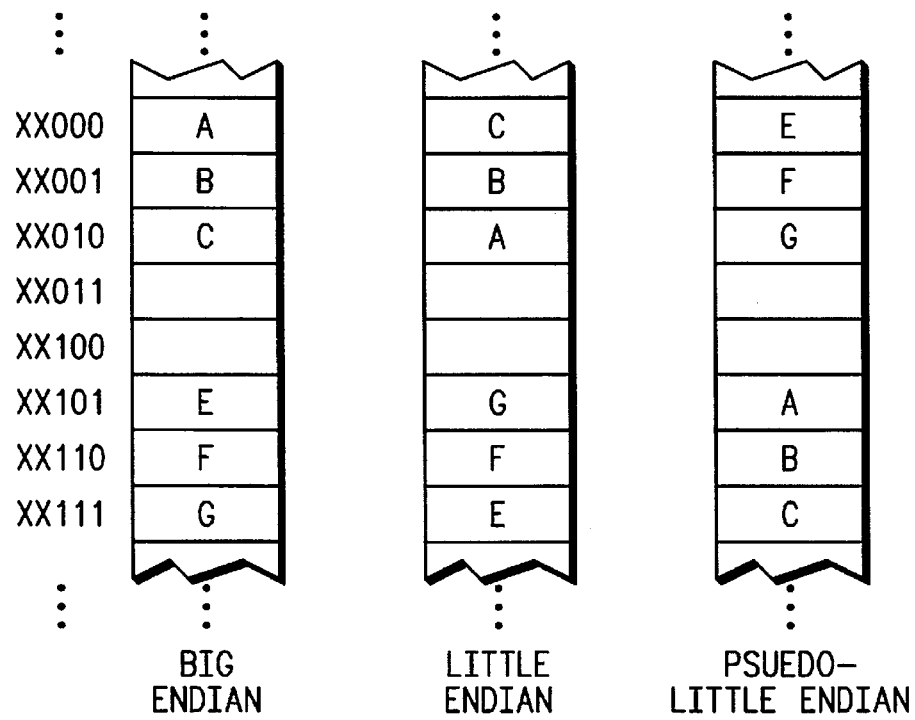

For instance, FIG. 3 may be used to describe a one word write (bytes ABCD) or two one-word writes (bytes ABCDEFGH) from a local bus device to address XX000 of main memory 14. In such a transaction, control unit 24 initially asserts the control signal LATCH_ADDRESS latching the destination address of the transaction. This address is output to the processor address bus where it is used by main memory 14 to select a unique storage location. Control unit 24 then latches the incoming data word in either local data low latch 28 or local data high latch 30.

If the local bus device is operating in LE mode and the transaction starts in the first word of an aligned double-word (ADDRESS(29) is zero), then the first four incoming bytes correspond to DCBA and the second four incoming bytes correspond to HGFE. (This byte order is depicted in the center portion of FIG. 3.) In this case, the logic function A is true. Control unit 24 causes local data low latch 28 to sample and hold the incoming data. As described above, incoming data is always byte-swapped at least once. Therefore, local data low latch 28 receives ABCD. Multiplexer 32 selects its non-byte swapped input and routes bytes ABCD to addresses XX100 through XX111. After a transfer of four data bytes, the logic function B is true. Control unit 24 causes local data high latch 30 to sample and hold the incoming data. Again, incoming data is always byte-swapped. Therefore, local data high latch 30 receives EFGH. Multiplexer 34 selects its non-byte swapped input and routes bytes EFGH to addresses XX000 through XX011. The ultimate byte ordering, EFGHABCD, is depicted in the right-hand portion of FIG. 3. Interbus buffer 18 outputs sixty-four data bits with the appropriate byte enable signals to the processor bus after the local data high latch 30 latches its data.

If the local bus device is operating in BE mode in the above example, then the first four incoming bytes correspond to ABCD and the second four incoming bytes correspond to EFGH. (This byte order is depicted in the left-hand portion of FIG. 3.) Here, the logic function A is false and control unit 24 causes local data high latch 30 to sample and hold the incoming data. As described above, incoming data is always byte-swapped at least once. Therefore, local data high latch 30 receives DCBA. Multiplexer 34 selects its byte swapped input and routes bytes ABCD to addresses XX000 through XX011. After a transfer of four data bytes, the logic function B is true and control unit 24 causes local data low latch 28 to sample and hold the incoming data. Again, incoming data is always byte-swapped. Therefore, local data low latch 28 receives HGFE. Multiplexer 32 selects its byte swapped input and routes bytes EFGH to addresses XX100 through XX111. The ultimate byte ordering, ABCDEFGH, is depicted in the left-hand portion of FIG. 3. Interbus buffer 18 outputs sixty-four data bits with the appropriate byte enable signals to the processor bus after the local data low latch 28 latches its data.

It should be noted that control unit 24 would have continued to toggle between local data low latch 28 and local data high latch 30 had the local bus device continued to source data. As described above, the local bus device will not indicate its transaction size beforehand. Therefore, incoming data can not be reordered by byte lane multiplexing. Control unit 24 must reorder the incoming data.

Continuing with another example, FIG. 3 may be used to describe two consecutive writes of bytes ABCD and EFGH from data processor 12 to addresses XX000 and XX100, respectively, of the local bus. In such a transaction, control unit 24 initially asserts neither control signal PROCESSOR_LOW_SELECT nor PROCESSOR_HIGH_SELECT, causing multiplexer 50 to output the destination address of the transaction. This address is output to the local bus where it is used to select a unique storage location in one of devices 16. Meanwhile, one of double word latches 36, 38, 40 or 42, latches the incoming double word depending upon the location of the double word in an aligned double quad-word. The remaining three doublewords in the aligned double quad-word are "don't cares." The data latched by double word latches 36, 38, 40 or 42 is ordered according to the BE mode when data processor 12 and interbus buffer 18 are in the BE mode. The data latched by double word latches 36, 38, 40 or 42 is ordered according to the PLE mode when data processor 12 is in the PLE mode and when interbus buffer 18 is in the LE mode.

If the local bus device is operating in LE mode and the transaction starts in the first word of a double-word (ADDRESS(29) is zero) and the DATA_COUNT is not equal to one, then the logic function E is true. Multiplexer 44 outputs bytes ABCD to multiplexer 48 and bytes EFGH to multiplexer 46. (Data processor 12 is operating in PLE mode.) Multiplexers 46 and 48 select their non-byte swapped inputs and route their outputs to multiplexer 50. Control unit 24 causes multiplexer 50 to select the output of multiplexer 48, bytes ABCD. As described above, the outgoing data is always byte-swapped after multiplexer 50. Therefore, the local bus device stores the bytes DCBA at the addresses XX000 through XX011. After a transfer of four data bytes, the logic function B is true. Control unit 24 causes multiplexer 50 to select the output of multiplexer 46, bytes EFGH. As described above, the outgoing data is byte-swapped. Therefore, the local bus device stores the bytes HGFE at the addresses XX100 through XX111. The ultimate byte ordering, DCBAHGFE, is depicted in the center portion of FIG. 3.

If the local bus device is operating in BE mode and the transaction starts in the first word of a double-word (ADDRESS(29) is zero), then the logic function E is false. Multiplexer 44 outputs bytes ABCD to multiplexer 46 and bytes EFGH to multiplexer 48. (Data processor 12 is operating in BE mode.) Multiplexers 46 and 48 select their byte swapped inputs and route their outputs to multiplexer 50. Control unit 24 causes multiplexer 50 to select the output of multiplexer 46, bytes DCBA. As described above, the outgoing data is always byte-swapped after multiplexer 50. Therefore, the local bus device stores the bytes ABCD at the addresses XX000 through XX011. After a transfer of four data bytes, the logic function B is true. Control unit 24 causes multiplexer 50 to select the output of multiplexer 48, bytes HGFE. As described above, the outgoing data is byte-swapped. Therefore, the local bus device stores the bytes EFGH at the addresses XX100 through XX111. The ultimate byte ordering, ABCDEFGH, is depicted in the left-hand portion of FIG. 3.

Although the present invention has been described with reference to a specific embodiment, further modifications and improvements will occur to those skilled in the art. For instance, the disclosed invention may be incorporated into data processor 12. It is to be understood therefore, that the invention encompasses all such modifications that do not depart from the spirit and scope of the invention as defined in the appended claims.

What is claimed is:

1. An interbus buffer comprising:

a first data path receiving N data bits from a first bus and transmitting 2N data bits to a second bus, where N is an integer, the first bus coupled to a first device and transmitting data according to a little endian protocol, a second device coupled to the second bus and transmitting data according to a pseudo- or munged little endian protocol, the first data path comprising:

a first latching means coupled to the first bus, the first latching means latching N data bits of 2N data bits responsive to a first control signal;

a first 2:1 switching means coupled to the output of the first latching means and to a byte reversed output of the first latching means, an output of the first 2:1 switching means selected responsive to whether the first device is operating in a big endian byte ordering mode or a little endian byte ordering mode;

a second latching means coupled to the first bus, the second latching means latching a differing N data bits of the 2N data bits responsive to a second control signal, a second 2:1 switching means coupled to the output of the second latching means and to a byte reversed output of the second latching means, an output of the second 2:1 switching means selected responsive to whether the first device is operating in the big endian byte ordering mode or the little endian byte ordering mode, the output of the first and second 2:1 switching means concatenated to form a data output to the second bus;

a second data path receiving 2N data bits from the second bus and transmitting N data bits to the first bus, the second data path comprising:

a third 2:1 switching means receiving a first N sequential bits of the 2N data bits from the second bus and a byte reversal of the first N sequential bits of the 2N data bits, an output of the third 2:1 switching means selected responsive to whether the second device is operating in a big endian byte ordering mode or a "munged" little endian byte ordering mode;

a fourth 2:1 switching means receiving a second N sequential bits of the 2N data bits from the second bus and a byte reversal of the second N sequential bits of the 2N data bits, an output of the fourth 2:1 switching means selected responsive to whether the second device is operating in a big endian byte ordering mode or a "munged" little endian byte ordering mode;

a fifth 2:1 switching means receiving the output of the third switching means and the output of the fourth switching means, an output of the fifth 2:1 switching means selected responsive to a third control signal; and a control unit coupled to the first data path and the second data path, the control unit generating the first, second, and third control signals responsive to an input address, the input address identifying a memory address of data to be transferred by the interbus buffer.

2. The interbus buffer of claim 1 wherein the first and second latching means are coupled to byte reversal of the first bus.

* * * * *